United States Patent Office 3,555,737
Patented Jan. 19, 1971

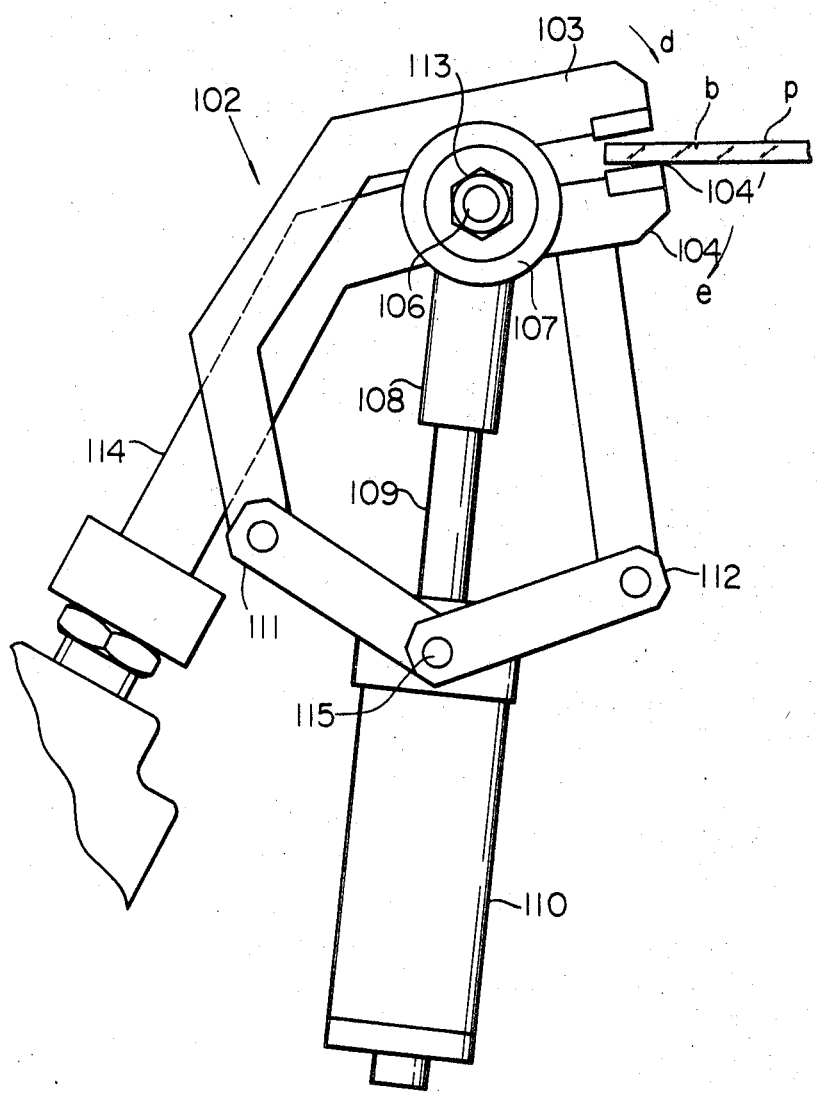

3,555,737
APPARATUS FOR TREATING GLASS SHEETS
Osamu Terakado, Kawasaki, and Kiyoshi Imamura, Mukomachi, Japan, assignors to Nippon Safety Glass Co. Ltd., Kawasaki, Japan
Filed June 3, 1969, Ser. No. 829,852
Claims priority, application Japan, June 10, 1968, 43/39,382
Int. Cl. B24b 7/00
U.S. Cl. 51—5
5 Claims

ABSTRACT OF THE DISCLOSURE

An apparatus for treating glass sheets, which comprises in combination rotary carrier means, and a loading and unloading station, a scoring station, a breaking-off station and an edge-working station arranged circumferentially of said rotary carrier means, and which is operative in such a manner that a parent glass sheet picked up by said carrier means at the loading and unloading station is intermittently shifted to the scoring station, the breaking-off station, the edge-working station and back to the loading and unloading station in sequence incident to the intermittent rotation of said rotary carrier means, while being carried by said carrier means, whereby the glass sheet is successively worked at said respective working stations according to the profile of a template provided at each station and delivered from the apparatus as a finished glass sheet.

BACKGROUND OF THE INVENTION

Field of the invention

The present invention relates to an apparatus for treating glass sheets and more particularly relates to an apparatus for treating glass sheets, which comprises glass sheet carrier means consisting of a rotatable post disposed at the center of the apparatus and a plurality of glass sheet carrier arms extending radially from said rotatable post and rotating together with said rotatable post, and a plurality of working stations arranged along a circumference concentric with said rotatable post with a predetermined angular distance therebetween, each of said arms carrying a parent glass sheet from one of said working stations to another in sequence during its complete rotation about said rotatable post while subjecting said parent glass sheet to scoring, breaking-off and edge-working at said respective working stations.

Description of the prior art

In the production of a large number of glass sheets from parent glass sheets while subjecting said parent glass sheets to such treatments as scoring, breaking-off and edge-working, in accordance with a particular shape, it has been customary to convey the parent glass sheets scoring, breaking-off and edge-working stations from one another in sequence which are arranged rectilinearly or along a certain or circumference path. In this case, a parent glass sheet supported by a suction cup is conveyed to the respective working stations by means of a carrier which carries said suction cup, and is worked at each station according to the profile of one of templates which are also carried on said carrier. With reference, for example, to the scoring and edge-working operations, the scoring is effected so as to leave a marginal area for the subsequent edge grinding. Therefore, the same template cannot be used for both the scoring and grinding operations and different templates must be provided, each for each operation, separately. Namely, in the conventional apparatus templates must be provided in a number same as the number of the working stations and, therefore, much attention is required for arranging these templates in a proper sequence.

SUMMARY OF THE INVENTION

The present invention provides a novel apparatus for treating glass sheets, which is designed to operate in such a manner that a parent glass sheet supported by a suction cup mounted on each of a plurality of carrier arms extending radially outwardly from a rotatable post at the center of the apparatus is carried from a loading station to a scoring station by the rotation of said rotatable post through a predetermined angle, e.g. 90°, and scored at said scoring station while being supported by the carrier arm, and upon completion of the scoring, said glass sheet is carried to a breaking-off station by another 90° rotation of the post, where the glass sheet is subjected to a breaking-off operation while being supported by the carrier arm, and thence to an edge-working station by further 90° rotation of the post, where it is subjected to an edge-grinding operation while still being supported by the carrier arm, and finally to the original loading station by further 90° rotation of the rotatable post while being supported by the carrier arm, where said glass sheet is released from the carrier arm to be delivered to the next station. In this case, the carrier arms are provided in a number same as the number of the working stations and in such an arrangement that when a glass sheet carried by one of the carrier arms is positioned in a certain working station, the other glass sheet or sheets carried by the other carrier arm or arms are positioned in the other station or stations so that all of the other operations, including the loading and unloading operations, are carried out simultaneously at said other working station or stations.

According to a feature of the present invention, an apparatus for treating glass sheets comprises, in combination, glass sheet carrier means and a plurality of working stations, said glass sheet carrier means comprising an upright central post rotatably mounted on a base, a plurality of arms extending radially outwardly from the top end of said central post and rotated by said central post integrally therewith, means for intermittently rotating said central post through a predetermined angle, each of said arms having a small shaft extending vertically downwardly toward the base from the free end thereof and rotatable relative to said arm, said small shaft being provided at the lower extreme end thereof with a suction cup adapted to rigidly support a glass sheet to be worked and at an intermediate portion thereof with a profiling template fixedly secured at right angles thereto, and means for rotating said small shafts of the respective arms individually; and said plurality of working stations being arranged circumferentially along the path of the outer ends of said arms with a predetermined circumferential distance therebetween and provided with means to work each of the glass sheets brought thereinto while being supported by the respective suction cups according to the profile of the template.

According to another feature of the present invention, the template has its outer peripheral edge bevelled and a follower roller to engage the associated template also has a bevelled surface for mating with said bevelled edge of the template.

The apparatus of the present invention being constructed as described above, by displacing the point of contact between the peripheral edge of the following roller and the peripheral edge of the template along the line of contact it is possible to score a glass sheet with a certain margin or allowance. Therefore, loading, scoring and edge-working, and if necessary, drilling and groove formation can be performed with a single template. Moreover, since a glass sheet is held by the suction cup in a fixed position relative to the template, repositioning of the glass sheet upon transfer of said glass sheet from one working station to another is not required.

Other objects, features and advantages of the present invention will become apparent from the following description with reference to the accompanying drawings.

BRIEF DESCRIPTION OF THE DRAWINGS

FIGS. 8 and 9 are side views of a glass sheet breaking-off device, wherein FIG. 8 shows the position of the device before gripping a glass sheet and FIG. 9 shows the position immediately before gripping the glass sheet.

DESCRIPTION OF THE PREFERRED EMBODIMENT

Figure 1:
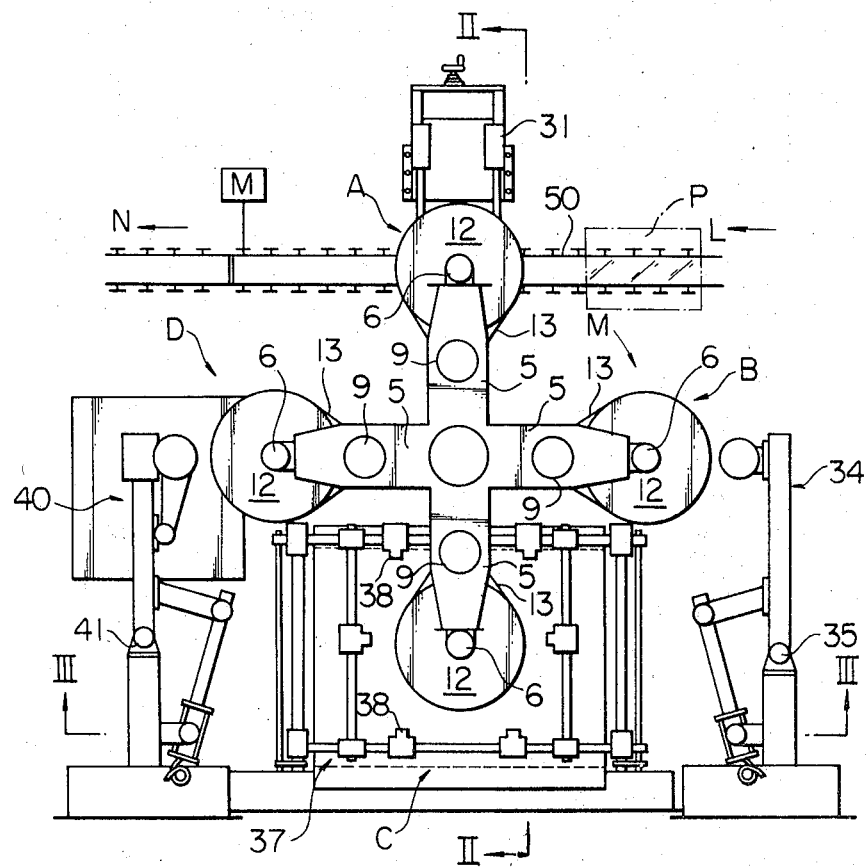
FIG. 1 is a plan view diagrammatically showing the overall arrangement of the apparatus according to the present invention.

In a preferred embodiment of the invention, a vertical central post 2 is rotatably mounted on a base 1 and the lower portion of said post is provided with a Geneva gear or movement means 3 extending radially outwardly therefrom and engaging an ordinary driving engagement means 4, whereby the post is intermittently rotated in one direction through a predetermined angle (90° in the embodiment shown). The post 2 has four radial arms 5 of the same length fixed to the top end thereof at right angles thereto, and each arm is provided with a small shaft 6 extending downwardly from the free end thereof and rotatable relative to the associated arm, the lengths of the small shafts 6 of the respective arms 5 being the same. Each of the same shafts 6 is provided with a suction cup 7 at the lower end and a template 8 at an intermediate portion thereof, said template being fixed to said small shaft at a right angle thereto. A motor 9 is mounted on each arm 5 with the drive shaft thereof extending downwardly through said arm and a pulley 11 is mounted to the lower end of the drive shaft. On the other hand, a pulley 12 is mounted on the shaft 6 at a corresponding location to the pulley 11 and a V-belt 13 is engaged around the pulleys 11 and 12. Thus, it will be seen that the shaft 6 is driven from the motor 9 through the pulley 12, the V-belt 13 and the pulley 12. As shown in FIG. 1, around the central post 2 are provided a glass sheet loading and unloading station A, a scoring station B, a breaking-off station C and an edge-working station D. These stations are arranged circumferentially of a circle concentric with the post 2 in a circumferentially equally spaced relation to each other. In the embodiment shown, the stations A, B, C and D are arranged along the travelling path of the shafts 6 at an angular distance of 90°.

LOADING AND UNLOADING STATION

Figure 4:
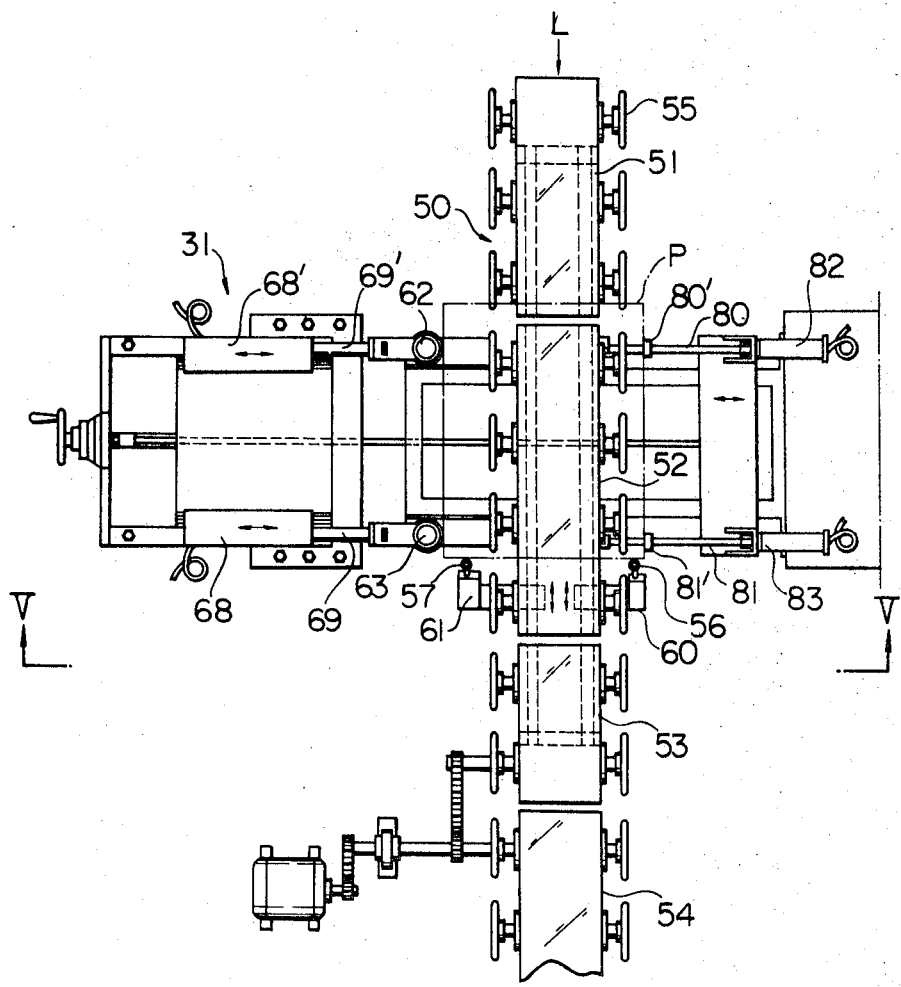
FIG. 4 is a plan view of a loading station.
Figure 5:
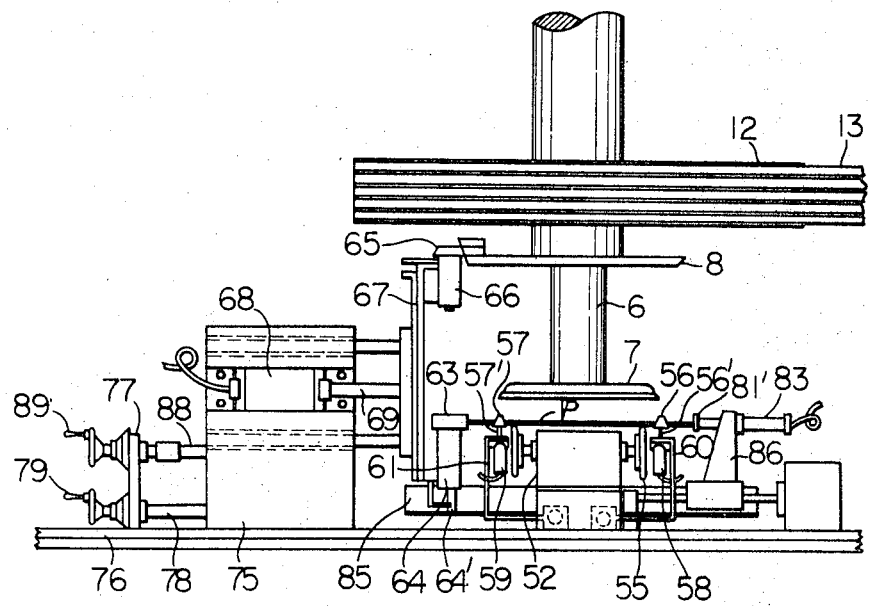
FIG. 5 is a side view of the loading station as viewed from the line V—V of FIG. 4.

The loading and unloading station, generally indicated by 50, comprises independent elongate wheel conveyors 51, 52, 53 and 54 arranged in tandem and a plurality of pairs of wheels 55 having the same diameter are arranged symmetrically on both sides of each of said conveyors as shown in FIG. 4. The wheels in each conveyor are driven at the same speed and in the same direction, independently of the wheels of the other conveyors. A glass sheet P is conveyed from the rear end of the conveyor 51, or from the top end of the conveyor 51 as viewed in FIG. 4, in the direction of the arrow L. Forwardly of the conveyor 52 are provided a pair of stoppers 56, 57 on both sides of said conveyor. As shown in FIG. 5, the stoppers 56, 57 are respectively mounted on rods 56', 57' which are connected for example, to pistons (not shown) reciprocating in hydraulic cylinders 58, 59. Therefore, when the stoppers 56, 57 are moved upwardly upon actuation of the respective cylinders 58, 59, the glass sheet being transported on the wheel conveyors abuts against said stoppers at its forward edge and thus held in its position. In this case, the forward edge position of the glass sheet is defined by the stoppers. The cylinders 58, 59 are suspended on brackets, 60, 61 respectively which are provided on both sides of the conveyor 52.

Figure 6:
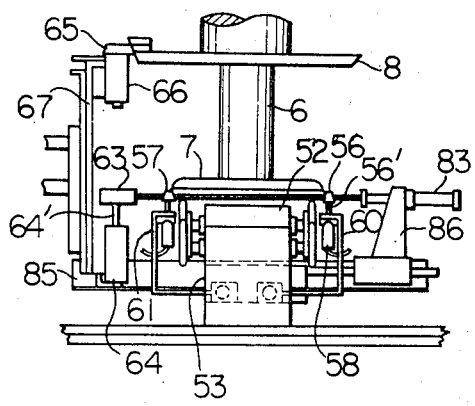
FIG. 6 is a fragmentary view of the loading station shown in FIG. 5.

On the left side of the conveyor 52, as viewed in FIG. 4, are provided a pair of stoppers 62, 63 on the same level as the glass sheet P for engagement with a side edge of the glass sheet. These stoppers 62, 63 are adjustably mounted on the top ends of rods 64' which are extending upwardly through a pair of mounting members 64 respectively, as best shown in FIG. 6. Spaced above the stoppers 62, 63 are a pair of contact members 65 which are adjustably mounted on mounting members 66 respectively. The pairs of the mounting members 64 and 66 are respectively connected to coupling members 67 which are in turn connected to piston rods 69, 69' of hydraulic cylinders 68, 68' respectively, so that each pair of the mounting members 64 and 66 may be moved in a direction transversely of the conveyor 52, integrally with the stoppers and the contact members mounted thereon.

The piston rods 69, 69' of the respective cylinders 68, 68' are shifted simultaneously toward the conveyor 52 with the same stroke in a known manner. Therefore, the coupling members 67, connected to said respective piston rods, are also shifted toward the conveyor 52 and at the end of their stroke, the contact members 65 are brought into contact with one side of the template 8. The positions of the stoppers 62, 63 are determined by the engagement between the contact members 65 and the template 8 and accordingly the position of one side edge of the glass sheet P is determined by the stoppers 62, 63 which are on contact with said side edge. The cylinders 68, 68' are mounted on a mounting block 75 and the lateral position of said mounting block is adjusted by a handle 79 which is connected to one end of a threaded rod 78 screw-threaded through a vertical frame 77 which is mounted on a guide 76 on the base. At the same time, the horizontal positions of the mounting members 64, 66, the stoppers 62, 63 and the contact members 65 are adjusted properly.

On the opposite side of the stoppers 62, 63 with respect to the conveyor 52 are provided a pair of members 80, 81 on substantially the same level as the glass sheet P, which members are movable toward and away from the conveyor 52 (FIG. 4). These members 80, 81 are piston rods of pistons (not shown) slidably mounted in respective hydraulic cylinders 82, 83 and have stoppers 80', 81' mounted at the forward ends thereof. Upon movement of the piston rods toward the conveyor 52, the stoppers 80', 81', carried thereon, are brought into contact with the other side edge of the glass sheet and thereby define the transverse position of the glass sheet on the conveyor 52 in cooperation with the stoppers 56, 57 on the other side.

Beneath the conveyor 52 is provided a supporting block 85 which supports said conveyor only by a suitable method and moves the same in a vertical direction by a known method. The cylinders 82, 83 are mounted on a pair of posts 86 which are in turn slidably mounted on the supporting block 85. The supporting block is adapted to adjust the posts in a transverse direction. The transverse position of the posts 86 are determined by rotating a handle 89 which is connected to one end of a threaded rod 88 threadedly extending through the frame 77.

Scoring device

Figure 7:
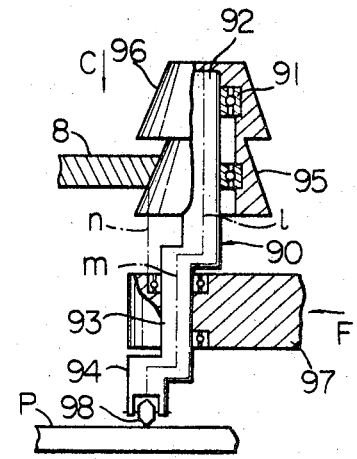
FIG. 7 is a side view of a scoring device with portions shown in section.

The essential portion of a scoring device provided at the scoring station B is shown in FIG. 7. This device, which is generally indicated by 90, comprises a central shaft 92, a first offset shaft 93 and a second offset shaft 94 integrally connected with each other stepwise in the same radial direction. The axes $l$, $m$ and $n$ of the respective shafts lie in one plane in parallel relation to each other and the lowermost shaft 94 is offset most with respect to the uppermost shaft 92. Two integral truncated conical members 95, 96 are rotatably mounted on the uppermost shaft 92 in tandem through bearings 91, with their convergent surfaces facing upwardly. These truncated conical members 95, 96 individually serve as a follower roller which is adapted to engage the mating bevelled edges of the respective templates. The intermediate shaft 93, that is, the first offset shaft, is rotatably supported by a pusher 97 through suitable bearings. The second offset shaft 94 has a wheel cutter 98 mounted on the lower end thereof by a known method.

When the shaft 6 is rotated while urging the pusher 97 perpendicularly toward the outer periphery of the template 8 in the direction of the arrow F, the glass sheet P and the template 8 rotate along with the shaft 6 and thus the glass sheet P is scored by the wheel cutter 98. In this case, the position of the follower roller or the truncated conical member 95 is previously adjusted in such a manner that the lower end point of the line of contact, in vertical section, between the bevelled edge of the template and the convergent surface of the member 95 lies in an extension of the axis of the second offset shaft 94, whereby the glass sheet can be scored according to the profile of the lower edge of said template. If the follower roller is mounted in a higher position with respect to the shaft 92, the wheel cutter 98 scores the glass sheet along a profile which is larger than the profile of the lower edge of the template.

The scoring device of the construction described above is incorporated in an apparatus 34 which is provided at the station B and pivotable horizontally about a pivot 35 (FIG. 1).

Breaking-off device

Figure 8:
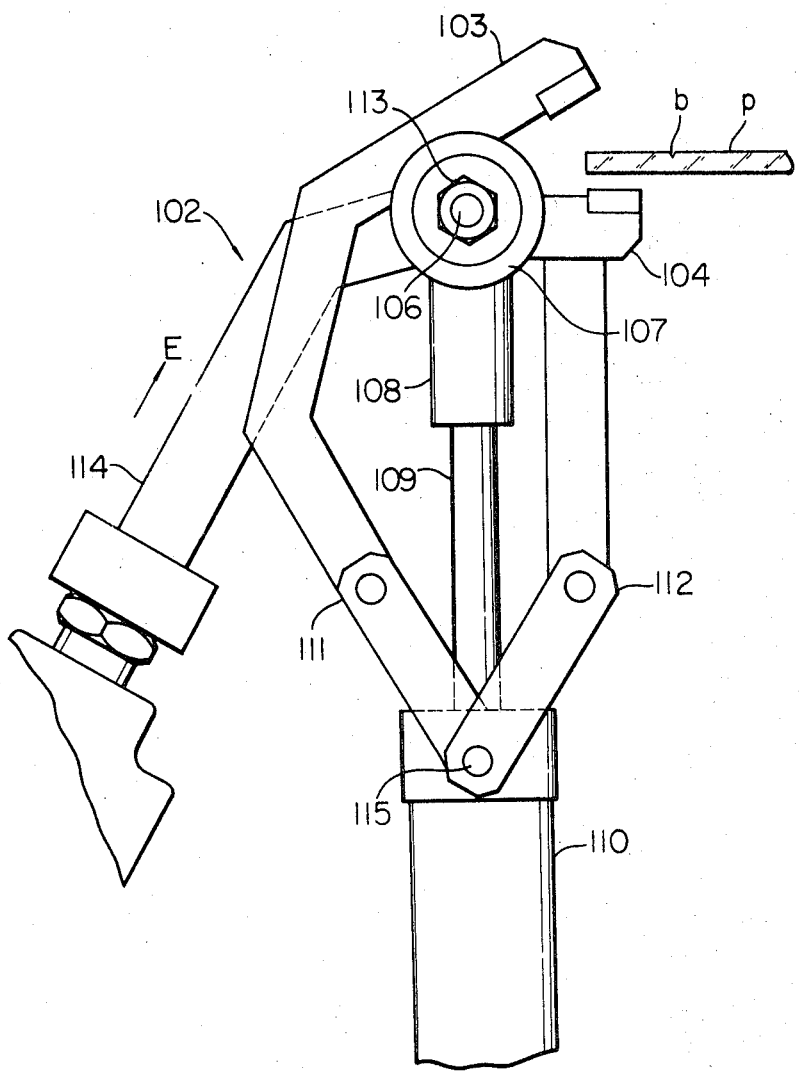

The essential portion of a breaking-off device provided at the breaking-off station C is shown in FIGS. 8 and 9. The breaking-off device, generally indicated by 102, comprises a pair of gripping levers 103, 104 which are pivotally mounted on a pivot pin 106 through a ball bearing 107. An outer casing of the bearing 107 is secured to a rod 108 which is in turn connected to a rod 109 of smaller diameter. The other end of the rod 109 is connected to a piston (not shown) slidably mounted in a cylinder 110. The cylinder 110 moves upwardly or downwardly along the rod 109 upon actuation of the piston. The aforesaid pair of gripping levers 103, 104 are articulated to links 111, 112 respectively, which are in turn pivotally connected to the peripheral wall of the upper portion of the cylinder 110 by means of a pin 115. Therefore, upon movement of the cylinder in a vertical direction, the gripping levers 103, 104 move substantially between the positions shown in FIG. 8 and the positions shown in FIG. 9. The pivot 106 is fixed on a rod 114 by a nut 113 or other suitable fixing parts, which rod 114 is moved reciprocally in the direction of the arrow E between an operative position and a rest position while maintaining the pivotal connection between said gripping levers and said pivot.

When the rod 114 is moved in the direction of the arrow E from the rest position and stopped in the operative position for engagement with the glass sheet P which has previously been scored as indicated at $b$ by the wheel cutter at the preceding scoring station B, the axis of the pivot 106 takes a position slightly below an extension of the central plane of the glass sheet, as shown in FIG. 8. The piston 110 is actuated in this state, whereupon the pivot takes the position shown in FIG. 9 and the working edge 104' of the gripping lever 104 is brought into contact with the underside of the glass sheet P. On further operation of the piston, the gripping lever 103 makes a further pivotal movement around the pivot 106 in the direction of the arrow $d$ and finally brought into contact with the upper edge of the glass sheet P. During this period, the gripping lever 104 continuously makes a pivotal movement in the direction of the arrow $e$, with the contact point between the edge 104' thereof and the glass sheet displacing relatively. Such relative displacement of the contact points between the gripping levers 103, 104 and the glass sheet continues slowly incident to a continuous operation of the piston, until the gripping levers grip the glass sheet in a position offset slightly downwardly of the central plane of said glass sheet. In this case, the gripping levers 103, 104 exert on the glass sheet a progressive increasing force to flex said glass sheet downwardly, while making a pivotal movement around the pivot 106 and finally breaks said glass sheet along the scored line $b$.

A plurality of such breaking-off devices as described above are mounted on a suitable mounting frame by a known method as indicated at 38 in FIG. 1, which mounting frame is arranged to surround a glass sheet having been brought into the breaking-off station C from the preceding scoring station B. In this case, the each breaking-off device is mounted in such a manner that the rod 114 can be reciprocally moved inwardly of the mounting frame in the direction of the arrow E (FIG. 8) toward one side edge of the glass sheet by means of a mechanism known in the art.

Figure 3:
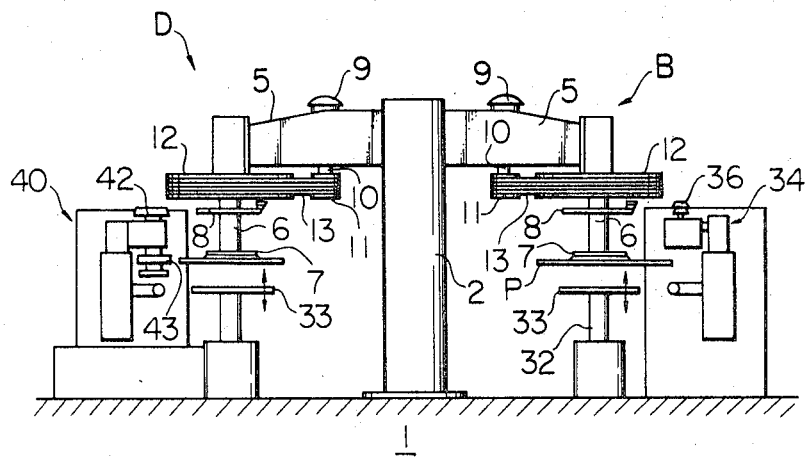
FIG. 3 is a sectional view taken along the line III—III of FIG. 1.

An edge-working device provided at the edge-working station D and indicated generally by 40 in FIG. 1 comprises, as shown in FIG. 3, a follower roller 42 which consists of a truncated conical roller similar to that used in the scoring device and pivotable around a pin 41 for engagement with the peripheral edge of the template, and a grinding member 43 for grinding the glass sheet.

At the stations B and D there is provided means for supporting the glass sheet to be worked from the underside, because the glass sheet supported by the suction cup 7 is worked while being rotated together with the shaft 6. Namely, as shown in FIG. 3, a shaft 32 which is rendered movable vertically from the base 1 by a known method, is provided in a coaxial relation to the shaft 6 of the arm 5 which has been shifted to each of these stations, and a clamp table 33 is mounted on the top end of said shaft 32. The shaft 32 is also rotatable around its own axis, so that when the glass sheet is held between the clamp table 33 and the suction cup 7, the shaft 32 rotates together with the shaft 6 and continuously holds the glass sheet without permitting the relative position of the glass sheet with respect to the shaft 6 to be displaced.

Operation

A glass sheet P to be worked is carried on the conveyor 50 in the direction of the arrow L and fed into the station A, where it is placed in a correct position, in the manner described before, with respect to the suction cup 7 of the shaft 6 which has been shifted into said station. Then, the conveyor 52 is elevated, whereupon the glass sheet is supported on the suction cup under suction. The driving means 4 is actuated at this point to rotate the Geneva gear 3 through an angle of 90° and thereby the glass sheet P is carried into the station B. At the station B, the shaft 32 is moved upwardly to hold the glass plate P positively between the table 33 and the suction cup 7, and then the motor 9 is placed in motion to rotate the glass sheet about the shaft 6. At the same time, the apparatus 34 is pivotally moved about the pivot pin 35 toward the glass sheet to place the scoring device in the position shown in FIG. 7. In this position, the follower roller of the scoring device is held in pressure contact with the peripheral edge of the template 8 under the biasing force of the pusher 97 acting in the direction of the arrow F and oscillated thereby as said template and the glass sheet make a complete turn. Therefore, the wheel cutter 98 is oscillated accordingly, scoring the surface of the rotating glass sheet according to the profile of the template 8.

Figure 2:
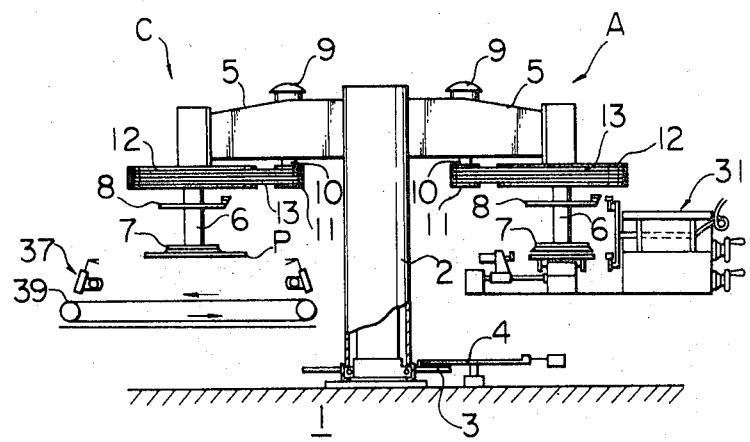
FIG. 2 is a sectional view taken along the line II—II of FIG. 1.

Upon completion of the scoring by a complete turn of the shaft 6, the table 33 is lowered and the post 2 is rotated through another 90° through the Geneva gear, whereby the scored glass sheet P is carried into the breaking-off station C. As the glass sheet has been set in position at this station, the rod 114 of each of the plurality of devices 38, mounted on the mounting frame, is forced in the direction of the arrow E, so that the gripping levers 103, 104 of the respective devices, surrounding the glass sheet, are brought into the gripping positions. Then, the cylinders 110 of the respective devices 38 are actuated all at once, whereupon the peripheral edge portion of the glass sheet is broken off along the scored line. The fragments of the broken glass drop onto a conveyor 39 (FIG. 2) and are carried away to the outside of the apparatus on said conveyor. The remaining glass sheet is then carried into the station D by further 90° rotation of the post 2. At the station D, the glass sheet is rotated a full turn incident to the rotation of the shaft 6, while being rigidly held between the suction cup 7 and the table 33. In this case, the follower roller 42 of the grinding device 40 is held in close contact with the peripheral edge of the template 8, with said device pivoting about the pivot pin 41, so that the peripheral edge of the glass sheet P is ground by the grinding member 43 according to the profile of said template. Upon completion of the grinding, the finished glass sheet is returned to the station A while being supported on the suction cup, and released from said suction cup to be placed on the conveyor 52. The stoppers 56, 57 are lowered to the original positions and the wheels 55 are driven, so that the finished glass sheet is delivered in the direction of the arrow N. Thus, a complete cycle of operation is accomplished.

Although the present invention has been described and illustrated with reference to a preferred embodiment thereof, it is to be understood that the present invention is not restricted only thereto but many changes and modifications are possible without deviating from the spirit and scope of the invention as defined in the appended claims.

What is claimed is:

1. An apparatus for treating glass sheets, comprising an upright central post rotatably mounted on a base, a plurality of radial arms connected to the top end portion of said central post at right angles thereto for rotation therewith, means for intermittently rotating said central post through a predetermined angle, each of said arms being provided with a small shaft vertically downwardly extending from the free end thereof toward the base and being rotatable relative thereto, each small shaft having a suction cup mounted to the lower end thereof for holding a glass sheet and at least one template fixedly mounted at an intermediate portion thereof in a right angled relation thereto, means for rotating said respective small shafts independently and a plurality of working stations arranged circumferentially of a travelling path of the outer ends of said arms with a predetermined circumferential distance therebetween and each provided with means for performing an assigned work on the individual glass plate being held by said suction cup in cooperation with said template.

2. An apparatus as defined in claim 1, in which said plurality of working stations include at least a loading and unloading station, a scoring station, a breaking-off station and an edge-working station.

3. An apparatus as defined in claim 1, in which said template has a bevelled outer peripheral edge and said working stations are each provided with profiling means for engagement with the outer peripheral edge of said template.

4. An apparatus as defined in claim 2, in which at least said scoring station and said edge-working station are each provided with a clamp table adapted to rigidly hold the glass sheet in cooperation with the suction cup, said clamp table being mounted on the top end of a rod which is vertically movably mounted on the base in a coaxial relation to the small shaft stationarily held in a correct position in the corresponding station and is rotatable along with said small shaft at the same rate of speed.

5. An apparatus as defined in claim 3, in which at least said scoring station and said edge-working station are each provided with a follower roller adapted to engage the bevelled outer peripheral edge of said template.

References Cited
UNITED STATES PATENTS

| | | | |
|---|---|---|---|
| 2,597,180 | 5/1952 | Reaser et al. | 51—101 |
| 3,140,567 | 7/1964 | Soong et al. | 51—108 |

WILLIAM R. ARMSTRONG, Primary Examiner

U.S. Cl. X.R.

51—108